United States Patent
Lee et al.

(10) Patent No.: US 10,999,843 B2
(45) Date of Patent: May 4, 2021

(54) METHOD AND APPARATUS FOR CALCULATING CHANNEL OCCUPANCY RATIO IN WIRELESS COMMUNICATION SYSTEM

(71) Applicant: LG ELECTRONICS INC., Seoul (KR)

(72) Inventors: Youngdae Lee, Seoul (KR); Hanbyul Seo, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 23 days.

(21) Appl. No.: 15/893,481

(22) Filed: Feb. 9, 2018

(65) Prior Publication Data

US 2018/0234973 A1    Aug. 16, 2018

Related U.S. Application Data

(60) Provisional application No. 62/457,210, filed on Feb. 10, 2017.

(51) Int. Cl.
*H04W 72/04* (2009.01)
*H04W 24/08* (2009.01)
(Continued)

(52) U.S. Cl.
CPC ....... *H04W 72/0453* (2013.01); *H04W 24/08* (2013.01); *H04W 72/0446* (2013.01);
(Continued)

(58) Field of Classification Search
CPC .............................................. H04W 72/0453
See application file for complete search history.

(56) References Cited

U.S. PATENT DOCUMENTS

2018/0255499 A1\*  9/2018  Loehr ................. H04W 76/23
2019/0132818 A1\*  5/2019  Yasukawa ............ H04W 4/04
(Continued)

FOREIGN PATENT DOCUMENTS

| CN | 201611089187.2 | \* | 12/2016 | ............ H04W 28/02 |
| CN | 201710066053.7 | \* | 2/2017 | ............ H04W 28/02 |
| WO | WO-2018062832 A1 | \* | 4/2018 | ............ H04W 72/12 |

OTHER PUBLICATIONS

3rd Generation Partnership Project (3GPP), "Technical Specification Group Radio Access Network; Evolved Universal Terrestrial Radio Access (E-UTRA); Medium Access Control (MAC) protocol specification (Release 14)," 3GPP TS 36.321 V14.1.0, Dec. 2016, 11 pages.

*Primary Examiner* — Kodzovi Acolatse
*Assistant Examiner* — Abdeltif Ajid
(74) *Attorney, Agent, or Firm* — Lee Hong Degerman Kang Waimey

(57) ABSTRACT

For congestion control is an important aspect for PC5-based vehicle-to-everything (V2X) communication, a channel occupancy ratio (CR) has been introduced. CR is defined as the total number of sub-channels used by a user equipment (UE) for its transmissions divided by the total number of configured sub-channels over a measurement period of 1000 ms. The present invention provides a method and apparatus for calculating a CR over past multiple N subframes up to a subframe at which data is to be transmitted in sidelink. Accordingly, new sidelink transmission (or retransmission) can be considered for CR measurement.

12 Claims, 6 Drawing Sheets

(51) Int. Cl.
H04W 88/04 (2009.01)
H04W 4/46 (2018.01)
H04W 28/02 (2009.01)

(52) U.S. Cl.
CPC .............. H04W 88/04 (2013.01); H04W 4/46 (2018.02); H04W 28/0289 (2013.01)

(56) References Cited

U.S. PATENT DOCUMENTS

2019/0182840 A1* 6/2019 Feng ..................... H04W 72/06
2019/0313279 A1* 10/2019 Li ..................... H04W 28/0289

* cited by examiner

METHOD AND APPARATUS FOR CALCULATING CHANNEL OCCUPANCY RATIO IN WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application No. 62/457,210, filed on Feb. 10, 2017, the contents of which are hereby incorporated by reference herein in its entirety.

BACKGROUND OF THE INVENTION

Field of the Invention

The present invention relates to wireless communications, and more particularly, to a method and apparatus for calculating a channel occupancy ratio (CR) including sidelink transmission in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China. 3GPP is actively conducting study and specification work on LTE-based V2X in order to respond to this situation. In LTE-based V2X, PC5-based V2V has been given highest priority. It is feasible to support V2V services based on LTE PC5 interface with necessary enhancements such as LTE sidelink resource allocation, physical layer structure, and synchronization.

Congestion control is an important aspect for PC5-based V2X, because it is expected that there are many UEs, including vehicles, pedestrians, road side units (RSUs), etc., involving V2X. Various aspects regarding congestion control for PC5-based V2X have been discussed.

SUMMARY OF THE INVENTION

The present invention provides a method and apparatus for calculating a channel occupancy ratio (CR) including sidelink transmission in a wireless communication system. The present invention provides a method and apparatus for calculating a CR considering sensing and resource selection procedure, specifically caused by a channel occupancy ratio limit (e.g. CR_limit).

In an aspect, a method for calculating a channel occupancy ratio (CR) by a user equipment (UE) in a wireless communication system is provided. The method includes receiving, by a UE from a network, a configuration of a radio channel resource occupancy limit, calculating, by the UE, a radio channel resource occupancy over past multiple N subframes up to a subframe at which data is to be transmitted in sidelink, and if the calculated radio channel resource occupancy is lower than the radio channel resource occupancy limit, transmitting, by the UE, the data in sidelink at the subframe.

In another aspect, a user equipment (UE) in a wireless communication system is provided. The UE includes a memory, a transceiver, and a processor, operably coupled to the memory and the transceiver, that controls the transceiver to receive, from a network, a configuration of a radio channel resource occupancy limit, calculates a radio channel resource occupancy over past multiple N subframes up to a subframe at which data is to be transmitted in sidelink, and if the calculated radio channel resource occupancy is lower than the radio channel resource occupancy limit, controls the transceiver to transmit the data in sidelink at the subframe.

DESCRIPTION OF EXEMPLARY EMBODIMENTS

The following description will focus on 3rd generation partnership project (3GPP) long-term evolution (LTE) advanced (LTE-A). However, technical features of the present invention are not limited thereto, and may be applied to other various technologies, e.g. a new radio access technology (new RAT or NR).

Figure 1:
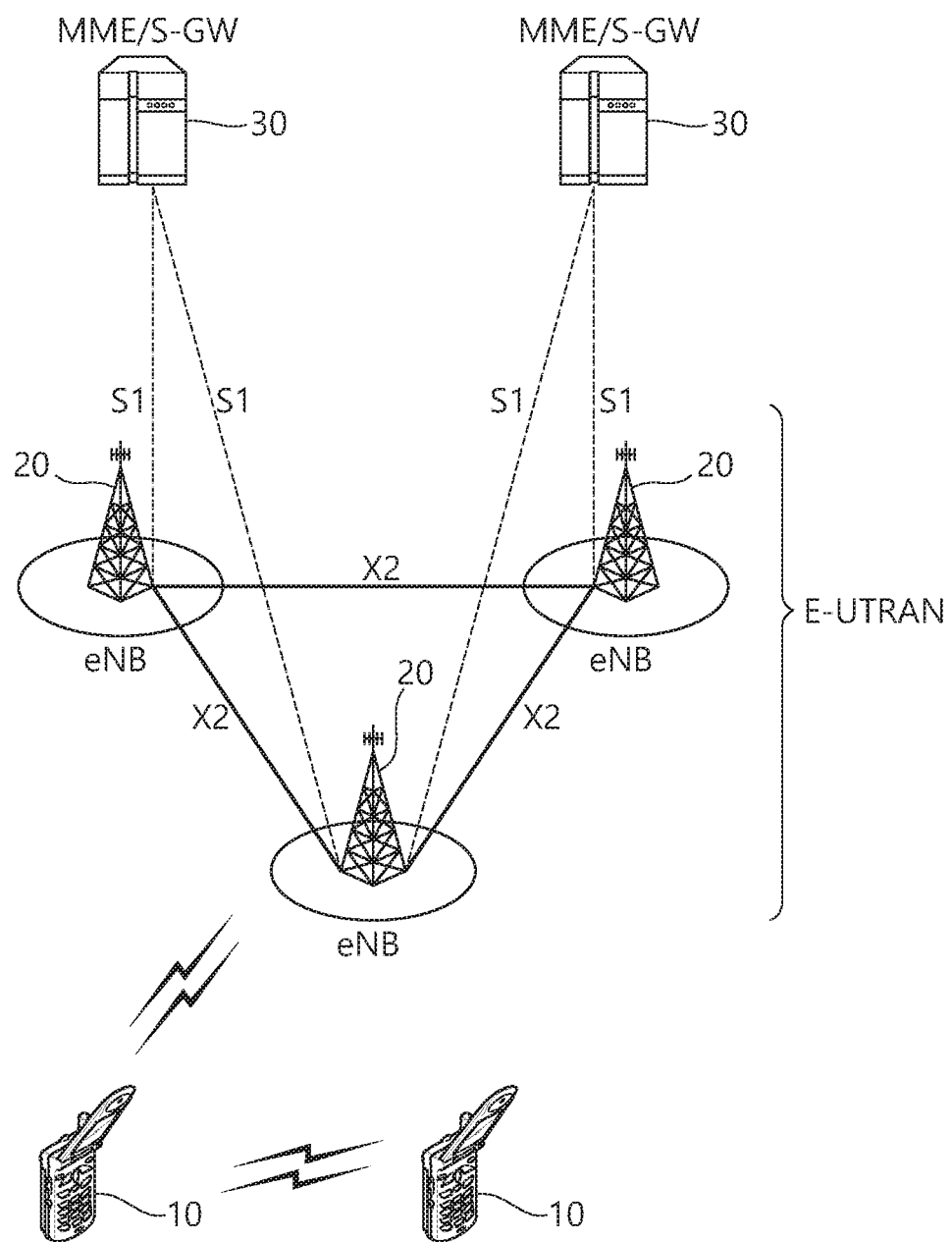
FIG. 1 shows LTE system architecture.

FIG. 1 shows LTE system architecture. Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an Si interface.

Figure 2:
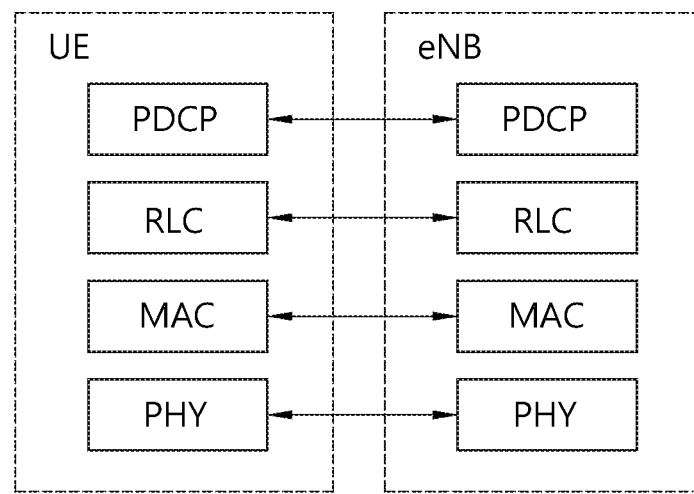
FIG. 2 shows a block diagram of a user plane protocol stack of an LTE system.
Figure 3:
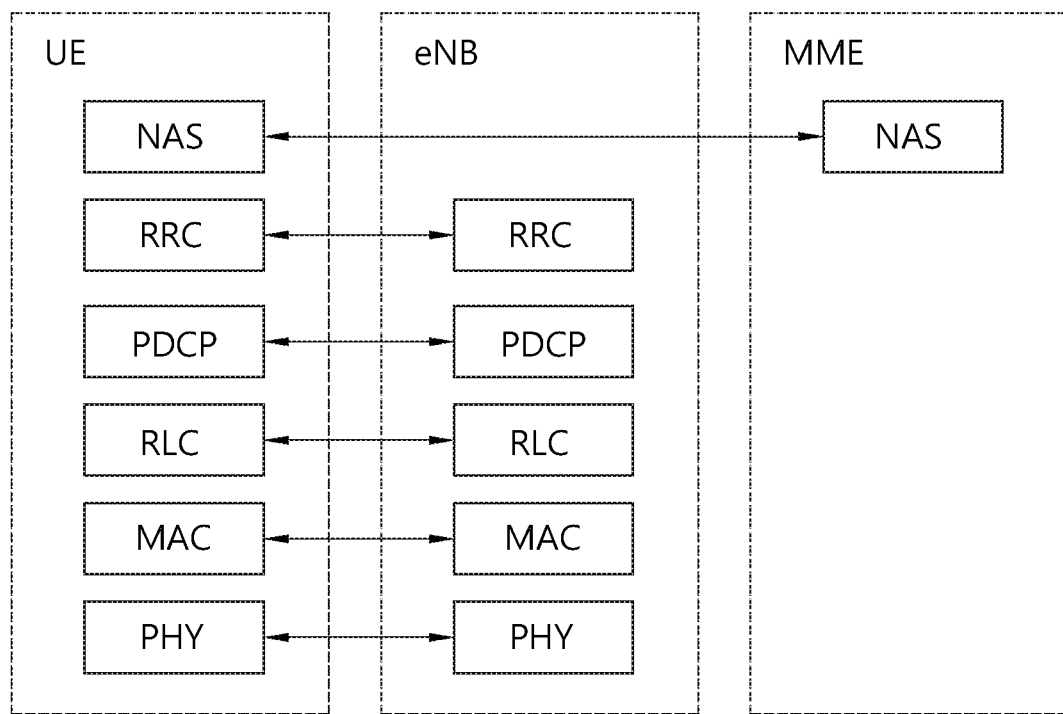
FIG. 3 shows a block diagram of a control plane protocol stack of an LTE system.

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Sidelink is described. Sidelink is UE to UE interface for sidelink communication, sidelink discovery and vehicle-to-everything (V2X) sidelink communication. The sidelink corresponds to the PC5 interface for sidelink communication and sidelink discovery, and for V2X sidelink communication. Sidelink communication is an AS functionality enabling proximity-based services (ProSe) direct communication, between two or more nearby UEs, using E-UTRA technology but not traversing any network node. Sidelink discovery is an AS functionality enabling ProSe direct discovery, using E-UTRA technology but not traversing any network node. V2X sidelink communication is an AS functionality enabling V2X communication, between nearby UEs, using E-UTRA technology but not traversing any network node.

E-UTRA defines two MAC entities, one in the UE and one in the E-UTRAN. These MAC entities handle sidelink transport channels, including a sidelink broadcast channel (SL-BCH), a sidelink discovery channel (SL-DCH), and a sidelink shared channel (SL-SCH).

In addition, the MAC entity provides data transfer services on sidelink logical channels, including a sidelink traffic channel (STCH), and a sidelink broadcast control channel (SBCCH). The MAC entity is responsible for mapping the sidelink logical channels to sidelink transport channels. The SBCCH is mapped to the SL-BCH. The STCH is mapped to the SL-SCH.

The UE supporting sidelink communication can operate in two modes for resource allocation. The first mode is a scheduled resource allocation, which can be called Mode 1. In Mode 1, the UE needs to be RRC_CONNECTED in order to transmit data. The UE requests transmission resources from the eNB. The eNB schedules transmission resources for transmission of sidelink control information and data. The UE sends a scheduling request (dedicated scheduling request (D-SR) or random access) to the eNB followed by a sidelink buffer status report (BSR). Based on the Sidelink BSR, the eNB can determine that the UE has data for a sidelink communication transmission and estimate the resources needed for transmission. The eNB can schedule transmission resources for sidelink communication using configured sidelink radio network temporary identity (SL-RNTI).

The second mode is a UE autonomous resource selection, which can be called Mode 2. In Mode 2, a UE on its own selects resources from resource pools and performs transport format selection to transmit sidelink control information and data. There can be up to 8 transmission pools either pre-configured for out of coverage operation or provided by RRC signalling for in-coverage operation. Each pool can have one or more ProSe per-packet-priority (PPPP) associated with it. For transmission of a MAC protocol data unit (PDU), the UE selects a transmission pool in which one of the associated PPPP is equal to the PPPP of a logical channel with highest PPPP among the logical channel identified in the MAC PDU. There is a one to one association between sidelink control pool and sidelink data pool. Once the resource pool is selected, the selection is valid for the entire sidelink control (SC) period. After the SC period is finished, the UE may perform resource pool selection again.

There are two types of resource allocation for discovery message announcement. The first type is a UE autonomous resource selection, which is a resource allocation procedure where resources for announcing of discovery message are allocated on a non UE specific basis. The UE autonomous resource selection may be called Type 1. In Type 1, the eNB provides the UE(s) with the resource pool configuration used for announcing of discovery message. The configuration may be signalled in broadcast or dedicated signaling. The UE autonomously selects radio resource(s) from the indicated resource pool and announces discovery message. The UE can announce discovery message on a randomly selected discovery resource during each discovery period.

The second type is a scheduled resource allocation, which is a resource allocation procedure where resources for announcing of discovery message are allocated on per UE specific basis. The scheduled resource allocation may be called Type 2. In Type 2, the UE in RRC_CONNECTED may request resource(s) for announcing of discovery message from the eNB via RRC. The eNB assigns resource(s) via RRC. The resources are allocated within the resource pool that is configured in UEs for announcement.

The UE supporting V2X sidelink communication can operate in two modes for resource allocation. The first mode is a scheduled resource allocation. The first mode for V2X sidelink communication may be called Mode 3. In Mode 3, the UE needs to be RRC_CONNECTED in order to transmit data. The UE requests transmission resources from the eNB. The eNB schedules transmission resources for transmission of sidelink control information and data.

The second mode is a UE autonomous resource selection. The second mode for V2X sidelink communication may be called Mode 4. In Mode 4, the UE on its own selects resources from resource pools and performs transport format selection to transmit sidelink control information and data. If mapping between the zones and V2X sidelink transmission resource pools is configured, the UE selects V2X sidelink resource pool based on the zone UE is located in. The UE performs sensing for (re)selection of sidelink resources. Based on sensing results, the UE (re)selects some specific sidelink resources and reserves multiple sidelink resources. Up to 2 parallel independent resource reservation processes are allowed to be performed by the UE. The UE is also allowed to perform a single resource selection for its V2X sidelink transmission.

SL-SCH data transfer/transmission is described. It may refer to Section 5.14.1 of 3GPP TS 36.321 V14.1.0 (2016-12). In order to transmit on the SL-SCH, the MAC entity must have at least one sidelink grant.

Sidelink grants are selected as follows for sidelink communication:

1> if the MAC entity is configured to receive a single sidelink grant dynamically on the PDCCH and more data is available in STCH than can be transmitted in the current SC period, the MAC entity shall:

2> using the received sidelink grant determine the set of subframes in which transmission of sidelink control information (SCI) and transmission of first transport block occur;

2> consider the received sidelink grant to be a configured sidelink grant occurring in those subframes starting at the beginning of the first available SC period which starts at least 4 subframes after the subframe in which the sidelink grant was received, overwriting a previously configured sidelink grant occurring in the same SC period, if available;

2> clear the configured sidelink grant at the end of the corresponding SC period;

1> else, if the MAC entity is configured by upper layers to receive multiple sidelink grants dynamically on the PDCCH and more data is available in STCH than can be transmitted in the current SC period, the MAC entity shall for each received sidelink grant:

2> using the received sidelink grant determine the set of subframes in which transmission of SCI and transmission of first transport block occur;

2> consider the received sidelink grant to be a configured sidelink grant occurring in those subframes starting at the beginning of the first available SC period which starts at least 4 subframes after the subframe in which the sidelink grant was received, overwriting a previously configured sidelink grant received in the same subframe number but in a different radio frame as this configured sidelink grant occurring in the same SC period, if available;

2> clear the configured sidelink grant at the end of the corresponding SC period;

1> else, if the MAC entity is configured by upper layers to transmit using one or multiple pool(s) of resources and more data is available in STCH than can be transmitted in the current SC period, the MAC entity shall for each sidelink grant to be selected:

2> if configured by upper layers to use a single pool of resources:

3> select that pool of resources for use;

2> else, if configured by upper layers to use multiple pools of resources:

3> select a pool of resources for use from the pools of resources configured by upper layers whose associated priority list includes the priority of the highest priority of the sidelink logical channel in the MAC PDU to be transmitted;

2> randomly select the time and frequency resources for SL-SCH and SCI of a sidelink grant from the selected resource pool. The random function shall be such that each of the allowed selections can be chosen with equal probability;

2> use the selected sidelink grant to determine the set of subframes in which transmission of SCI and transmission of first transport block occur;

2> consider the selected sidelink grant to be a configured sidelink grant occurring in those subframes starting at the beginning of the first available SC Period which starts at least 4 subframes after the subframe in which the sidelink grant was selected;

2> clear the configured sidelink grant at the end of the corresponding SC period;

Retransmissions on SL-SCH cannot occur after the configured sidelink grant has been cleared.

Sidelink grants are selected as follows for V2X sidelink communication:

1> if the MAC entity is configured to receive a sidelink grant dynamically on the PDCCH and data is available in STCH, the MAC entity shall:

2> use the received sidelink grant to determine the number of HARQ retransmissions and the set of subframes in which transmission of SCI and SL-SCH occur;

2> consider the received sidelink grant to be a configured sidelink grant;

1> else, if the MAC entity is configured by upper layers to transmit based on sensing using a pool of resources, the MAC entity selects to create a configured sidelink grant corresponding to transmissions of multiple MAC PDUs, and data is available in STCH, the MAC entity shall for each sidelink process configured for multiple transmissions based on sensing:

2> if SL_RESOURCE_RESELECTION_COUNTER=0 and the MAC entity randomly selects, with equal probability, a value in the interval [0, 1] which is above the probability configured by upper layers in probResourceKeep; or 2> if the configured sidelink grant cannot accommodate a RLC service data unit (SDU) by using the maximum allowed MCS configured by upper layers in maxMCS-PSSCH and the MAC entity selects not to segment the RLC SDU; or 2> if a pool of resources is configured or reconfigured by upper layers:

3> clear the configured sidelink grant, if available;

3> randomly select, with equal probability, an integer value in the interval [5, 15] and set SL_RESOURCE_RESELECTION_COUNTER to the selected value;

3> select the number of HARQ retransmissions from the allowed numbers configured by upper layers in allowedRetxNumberPSSCH, and an amount of frequency resources within the range configured by upper layers between minRB-NumberPSSCH and maxRB-NumberPSSCH;

3> select one of the allowed values configured by upper layers in restrictResourceReservationPeriod and set the resource reservation interval by multiplying 100 with the selected value;

3> randomly select one time and frequency resource from the resources indicated by the physical layer. The random function shall be such that each of the allowed selections can be chosen with equal probability;

3> use the randomly selected resource to select a set of periodic resources spaced by the resource reservation interval for transmission opportunities of SCI and SL-SCH corresponding to the number of transmission opportunities of MAC PDUs;

3> if the number of HARQ retransmissions is equal to 1 and there are available resources left in the resources indicated by the physical layer for more transmission opportunities:

4> randomly select one time and frequency resource from the available resources. The random function shall be such that each of the allowed selections can be chosen with equal probability;

4> use the randomly selected resource to select a set of periodic resources spaced by the resource reservation interval for the other transmission opportunities of SCI and SL-SCH corresponding to the number of retransmission opportunities of the MAC PDUs;

4> consider the first set of transmission opportunities as the new transmission opportunities and the other set of transmission opportunities as the retransmission opportunities;

4> consider the set of new transmission opportunities and retransmission opportunities as the selected sidelink grant.

3> else:

4> consider the set as the selected sidelink grant;

3> use the selected sidelink grant to determine the set of subframes in which transmissions of SCI and SL-SCH occur;

3> consider the selected sidelink grant to be a configured sidelink grant;

2> else if SL_RESOURCE_RESELECTION_COUNTER=0 and the MAC entity randomly selects, with equal probability, a value in the interval [0, 1] which is less than or equal to the probability configured by upper layers in probResourceKeep:

3> clear the configured sidelink grant, if available;

3> randomly select, with equal probability, an integer value in the interval [5, 15] and set SL_RESOURCE_RESELECTION_COUNTER to the selected value;

3> use the previously selected sidelink grant for the number of transmissions of the MAC PDUs with the resource reservation interval to determine the set of subframes in which transmissions of SCI and SL-SCH occur;

3> consider the selected sidelink grant to be a configured sidelink grant;

1> else, if the MAC entity is configured by upper layers to transmit based on either sensing or random selection using a pool of resources, the MAC entity selects to create a configured sidelink grant corresponding to transmission(s) of a single MAC PDU, and data is available in STCH, the MAC entity shall for a sidelink process:

2> select the number of HARQ retransmissions from the allowed numbers configured by upper layers in allowedRetxNumberPSSCH, and an amount of frequency resources within the range configured by upper layers between minRB-NumberPSSCH and maxRB-NumberPSSCH;

2> if transmission based on random selection is configured by upper layers:

3> randomly select the time and frequency resources for one transmission opportunity of SCI and SL-SCH from the resource pool. The random function shall be such that each of the allowed selections can be chosen with equal probability;

2> else:

3> randomly select the time and frequency resources for one transmission opportunity of SCI and SL-SCH from the resource pool indicated by the physical layer. The random function shall be such that each of the allowed selections can be chosen with equal probability;

2> if the number of HARQ retransmissions is equal to 1:

3> if transmission based on random selection is configured by upper layers and there are available resources for one more transmission opportunity:

4> randomly select the time and frequency resources for the other transmission opportunity of SCI and SL-SCH corresponding to additional transmission of the MAC PDU from the available resources. The random function shall be such that each of the allowed selections can be chosen with equal probability;

3> else, if transmission based on sensing is configured by upper layers and there are available resources, except the resources already excluded by the physical layer for one more transmission opportunity:

4> randomly select the time and frequency resources for the other transmission opportunity of SCI and SL-SCH corresponding to additional transmission of the MAC PDU from the available resources. The random function shall be such that each of the allowed selections can be chosen with equal probability;

3> consider a transmission opportunity which comes first in time as the new transmission opportunity and a transmission opportunity which comes later in time as the retransmission opportunity;

3> consider both of the transmission opportunities as the selected sidelink grant;

2> else:

3> consider the transmission opportunity as the selected sidelink grant;

2> use the selected sidelink grant to determine the subframes in which transmission(s) of SCI and SL-SCH occur;

2> consider the selected sidelink grant to be a configured sidelink grant; The MAC entity shall for each subframe:

1> if the MAC entity has a configured sidelink grant occurring in this subframe:
2> if the configured sidelink grant corresponds to transmission of SCI:
3> instruct the physical layer to transmit SCI corresponding to the configured sidelink grant;
3> for V2X sidelink communication, deliver the configured sidelink grant and the associated HARQ information to the Sidelink HARQ Entity for this subframe;
2> else if the configured sidelink grant corresponds to transmission of first transport block for sidelink communication:
3> deliver the configured sidelink grant and the associated HARQ information to the Sidelink HARQ Entity for this subframe.

Congestion control is an important aspect for PC5-based V2X, because it is expected that there are many UEs, including vehicles, pedestrians, road side units (RSUs), etc., involving V2X. Various aspects regarding congestion control for PC5-based V2X have been discussed, and specifically, some metrics evaluating/measuring congestion of PC5 interface have been introduced.

One of metrics introduced for PC5-based V2X congestion control is a channel busy ratio (CBR). CBR is defined for congestion measurement over PC5 in vehicle UEs (V-UEs).

CBR is defined as the portion of sub-channels whose sidelink received signal strength indicator (S-RSSI) exceed a (pre-)configured threshold observed during a CBR measurement duration, i.e. 100 ms. The followings have been agreed for the CBR measurement.
  Only the sub-channels included in the resource pool are used for the CBR measurement.
  For further study (FFS) on whether additional separated measurement is needed for scheduling assignment (SA) pool.
  For a UE in Mode 3, the eNB indicates a set of resources on which the UE perform the CBR measurement.
  For a UE in Mode 4, the CBR measurement is pool-specific.
  A UE measures CBR at least on its current transmission pool(s).
  FFS on whether a UE measures on a pool which is not its current transmission pool.
  UE reporting of CBR to the eNB is supported.
  Additional averaging at higher layer may be possible.
  Any high layer operation may be needed on CBR measurement.
  Additional measurement for SA pool is supported for SA-data non-adjacent case.
  A V-UE measures all the resource pools configured as transmission pools.
  FFS on CBR measurement on exceptional pools.
  Multiple measurements may be reported.
  Adaptation of the allowed set of values of radio-layer parameters is supported for congestion control.
  Both eNB-assisted and UE autonomous transmission parameter (re)configuration are supported.
  Transmission parameter (re)configuration based on CBR and priority are supported.
  FFS on which transmission parameters are (re)configured.
  FFS on whether resource reselection is immediately triggered in the event of parameter adaptation.

Another metric introduced for PC5-based V2X congestion control is a channel occupancy ratio (CR). CR is defined as the total number of sub-channels used by the UE for its transmissions divided by the total number of configured sub-channels over a measurement period of 1000 ms. The set of radio-layer parameters whose allowed values can be restricted by congestion control are as follows.
  Maximum transmit power (including zero power transmission)
  Range on number of retransmissions per transport block (TB)
  Range of physical sidelink shared channel (PSSCH) resource block (RB) number (according to sub-channel size)
  Range of MCS
  Maximum limit on occupancy ratio (CR_limit)
  FFS on whether resource reservation interval needs to be included.

The followings have been agreed for the CR measurement.
  Lookup table links CBR range with values of the transmission parameters for each PPPP.
  Up to 16 CBR ranges are supported.
  FFS on details of UE behavior, e.g. when the UE transmits MAC PDUs with different priorities, when and how the UE drops packet transmissions, any possible impact on sensing and resource selection procedure (e.g. caused by CR_limit).
  Any high layer operation may be needed on CR measurement.
  FFS on how frequently CR is measured, updated and whether it is further filtered or not.

According to the prior art, the UE measures the CR per PPPP. To transmit MAC PDU in sidelink, the UE shall ensure the following limit in Equation 1 is met per PPPP.

$$\sum_{i \le k} CR_i \le CRlimit_k \qquad < \text{Equation 1} >$$

In Equation 1, suffix i and k denote the PPPP of a packet in increasing priority order.

According to the prior art, the UE compares the currently measured CR with the CR_limit. When the measured CR is lower than or equal to the CR_limit, the UE can transmit MAC PDU in sidelink. When the measured CR is higher than the CR_limit, the UE cannot transmit MAC PDU in sidelink. However, the prior art does not consider the new sidelink transmission for measuring CR. Thus, even though CR is measured as lower than or equal to the CR_limit, and thus when the UE performs new sidelink transmission, the CR may not meet the CR limit as a result of this new sidelink transmission.

To address the problem of the prior art described above, the present invention provides a method for calculating a CR according to an embodiment of the present invention.

Figure 4:
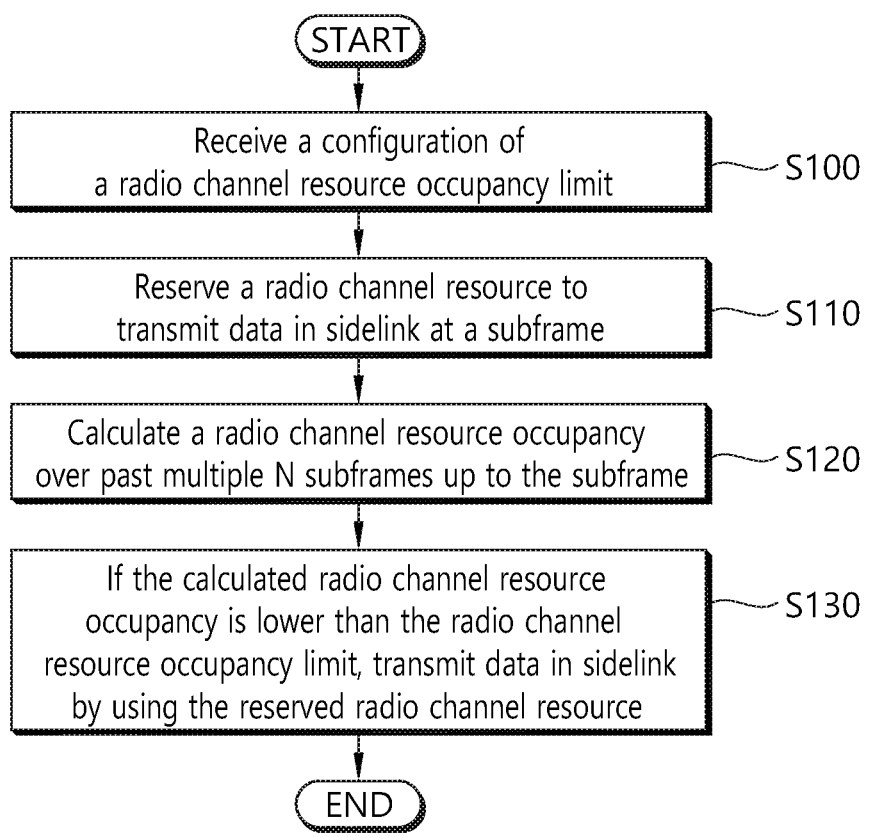
FIG. 4 shows a method for calculating a CR by a UE according to an embodiment of the present invention.

FIG. 4 shows a method for calculating a CR by a UE according to an embodiment of the present invention.

In step S100, the UE receives a configuration of a radio channel resource occupancy (i.e. CR) limit from a network. The radio channel resource occupancy limit may be CR_limit configured by the network. That is, the eNB or gNB may configure CR_limit for a UE. CR_limit may be configured per cell, per UE or per priority. The priority may be a PPPP. Upon receiving the configuration of a radio channel resource occupancy limit form the network, the UE sets a limit of radio channel resource occupancy.

In step S110, the UE may reserve a radio channel resource to transmit (or re-transmit) data in sidelink at a subframe.

In step S120, the UE calculates a radio channel resource occupancy (i.e. CR) over past multiple N subframes up to the subframe. In other words, the UE calculates CR over both past multiple N subframes and the subframe at which the data is to be transmitted in sidelink. The number of the past multiple N subframes plus the number of the subframe at the data is to be transmitted in sidelink is 1000 subframes, i.e. 1000 ms. Accordingly, a new sidelink transmission can be considered for measuring CR. The past multiple N subframes may be consecutive N subframes configured for sidelink transmissions of packets with the same priority in a particular time period. The sidelink transmissions of packets with the same priority may be sidelink transmissions addressed by SCI indicating the same priority (i.e. PPPP).

Figure 5:
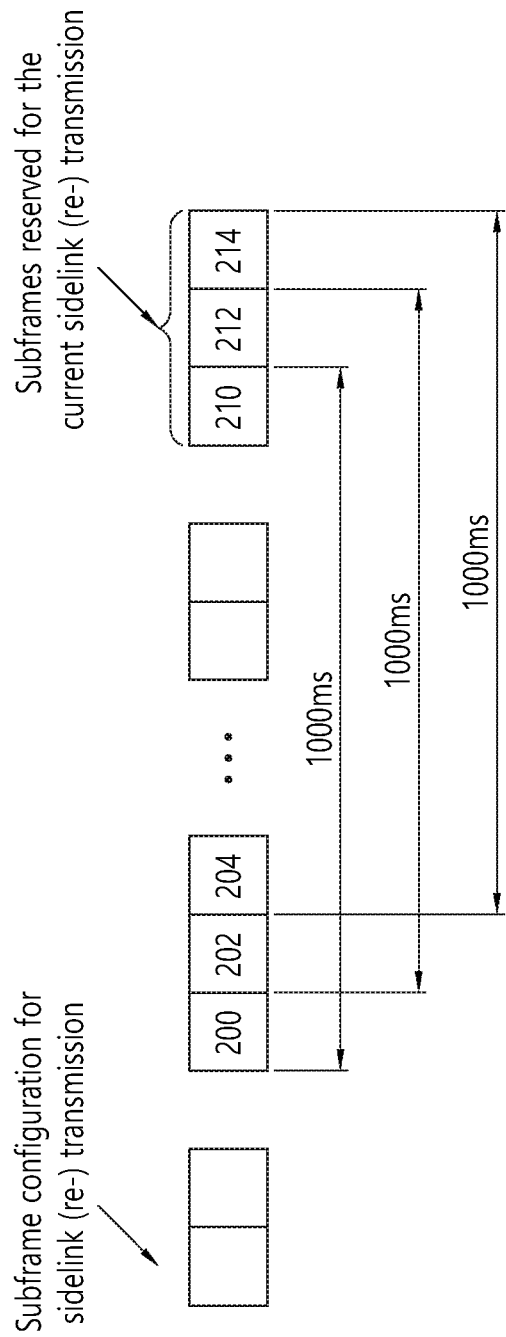
FIG. 5 shows an example of a duration in which a UE measures CR before performing either new transmission or retransmission according to an embodiment of the present invention.

In general, CR evaluated at subframe n is defined as the total number of sub-channels used for its transmissions in subframes [n−a, n−1] and granted in subframes [n, n+b] divided by the total number of configured sub-channels in the transmission pool over [n−a, n+b]. The subframes [n−a, n−1] corresponds to the past multiple N subframes, where 'a' is a positive integer. The subframes [n, n+b] corresponds to the subframe at which the radio channel resource to transmit (or re-transmit) data in sidelink is reserved, where 'b' is 0 or a positive integer. In the embodiment of FIG. 5, it is assumed that b=0, but it is only exemplary. 'a' and 'b' may be determined by UE implementation with a+b+1=1000, a≥500, and n+b should not exceed the last transmission opportunity of the grant for the current transmission.

In step S130, if the calculated radio channel resource occupancy is lower than or equal to the radio channel resource occupancy limit, the UE transmits (or re-transmits) data in sidelink at the subframe by using the reserved radio channel resource.

The detailed UE behavior is as follows. For each subframe of the SL-SCH and each sidelink process, the sidelink HARQ entity of the UE shall:

1> if a sidelink grant corresponding to a new transmission opportunity has been indicated for this sidelink process, the CR measured from the past 1000 ms up to and including this new transmission for the highest PPPP associated with the MAC PDU (or STCH mapped to the SL-SCH) is lower than CR_limit, and there is SL data, for sidelink logical channels of ProSe destination associated with this sidelink grant, available for transmission:

2> obtain the MAC PDU from the "Multiplexing and assembly" entity;
2> deliver the MAC PDU and the sidelink grant and the HARQ information to this Sidelink process;
2> instruct this Sidelink process to trigger a new transmission.

1> else, if this subframe corresponds to retransmission opportunity for this sidelink process and the CR measured from the past 1000 ms up to and including this retransmission for the highest PPPP associated with the MAC PDU (or STCH mapped to the SL-SCH) is lower than CR limit:

2> instruct this Sidelink process to trigger a retransmission.

FIG. 5 shows an example of a duration in which a UE measures CR before performing either new transmission or retransmission according to an embodiment of the present invention. The duration is determined as a period from the past 1000 ms up to the subframe reserved for the new transmission or the retransmission. Referring to FIG. 5, it is assumed that subframes reserved for new transmission or retransmission are subframes 210, 212 and 214. It takes 1000 subframes for sidelink transmission from subframe 200 to subframe 210, or from subframe 202 to subframe 212, or from subframe 204 to subframe 214. The UE may measure CR over 1000 subframes considering at least one subframe reserved for new transmission or retransmission, i.e. at least one of subframes 210, 212 or 214. Accordingly, the UE may measure CR over 1000 subframes from subframe 200 to subframe 210, or from subframe 202 to subframe 212, or from subframe 204 to subframe 214.

More specifically, when the UE has data to transmit in sidelink, the UE reserves sidelink subframe(s), i.e. subframes 210, 212 and 214. The UE constructs a MAC PDU including the data for this sidelink (re-)transmission. The MAC layer of the UE informs the physical layer of the UE about the highest priority (i.e. the highest PPPP) among priorities of MAC SDUs included in the MAC PDU. The UE measures radio channel resource occupancy (i.e. CR) over subframes used for sidelink transmissions with lower priorities than the highest priority and used for sidelink transmissions with the highest priority. Then, the UE measures CR during the duration by assuming that the new transmission or the retransmission is performed at the reserved subframe. That is, the UE may measure CR over 1000 subframes from subframe 200 to subframe 210, or from subframe 202 to subframe 212, or from subframe 204 to subframe 214. The compares the measured CR with the CR_limit. If the measured CR is lower than the CR_limit, the UE transmits or re-transmits the MAC PDU via the reserved sidelink subframe(s). The highest priority is indicated in the SCI associated with this sidelink (re-)transmission.

Figure 6:
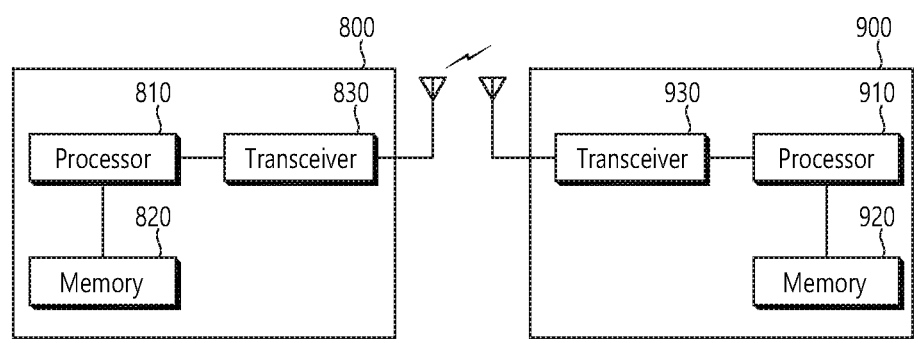
FIG. 6 shows a wireless communication system to implement an embodiment of the present invention.

FIG. 6 shows a wireless communication system to implement an embodiment of the present invention.

A network node 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, new sidelink transmission (or retransmission) can be considered for CR measurement. Therefore, CR can be measured effectively.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a wireless device in a wireless communication system, the method comprising:
   acquiring a configuration of a radio channel resource occupancy limit;
   reserving radio resources in a set of subframes for sidelink transmissions of media access control (MAC) protocol data units (PDUs),
   wherein the set of subframes comprises one or more first subframes reserved for one or more transmissions of a current MAC PDU and second subframes reserved for transmissions of one or more next MAC PDUs;
   constructing the current MAC PDU related with at least a radio resource in the one or more first subframes;
   determining a radio channel resource occupancy for a duration from past subframes used for transmissions up to the one or more first subframes reserved for the one or more transmissions of the current MAC PDU; and
   performing the one or more transmissions of the current MAC PDU based on that the radio channel resource occupancy is lower than the radio channel resource occupancy limit.

2. The method of claim 1, wherein the radio channel resource occupancy limit is configured per proximity-based services (ProSe) per-packet-priority (PPPP).

3. The method of claim 1, wherein the radio channel resource occupancy limit is related to a priority of the current MAC PDU, and
   wherein the priority of the current MAC PDU is a highest priority of MAC service data units (SDUs) included in the current MAC PDU.

4. The method of claim 3, wherein the priority of the current MAC PDU is indicated by sidelink control information (SCI) scheduling the current MAC PDU.

5. The method of claim 1, wherein a number of the past subframes is counted in 1000 ms up to the one or more first subframes reserved for the one or more transmissions of the current MAC PDU.

6. The method of claim 1, wherein the duration excludes the second subframes reserved for the transmissions of the one or more next MAC PDUs.

7. A wireless device in a wireless communication system, the wireless device comprising:
   a memory;
   a transceiver; and
   at least one processor, operably coupled to the memory and the transceiver, and configured to:
      acquire a configuration of a radio channel resource occupancy limit,
      reserve radio resources in a set of subframes for sidelink transmissions of media access control (MAC) protocol data units (PDUs),
      wherein the set of subframes comprises one or more first subframes reserved for one or more transmissions of a current MAC PDU and second subframes reserved for transmissions of one or more next MAC PDUs,
      construct the current MAC PDU related with at least a radio resource in the one or more first subframes,
      determine a radio channel resource occupancy for a duration from past subframes used for transmissions up to the one or more first subframes reserved for the one or more transmissions of the current MAC PDU, and
      perform the one or more transmissions of the current MAC PDU based on that the radio channel resource occupancy is lower than the radio channel resource occupancy limit.

8. The wireless device of claim 7, wherein the radio channel resource occupancy limit is configured per proximity-based services (ProSe) per-packet-priority (PPPP).

9. The wireless device of claim 7, wherein the radio channel resource occupancy limit is related to a priority of the current MAC PDU, and
   wherein the priority of the current MAC PDU is a highest priority of MAC service data units (SDUs) included in the current MAC PDU.

10. The wireless device of claim 9, wherein the priority of the current MAC PDU is indicated by sidelink control information (SCI) scheduling the current MAC PDU.

11. The wireless device of claim 7, wherein a number of the past subframes is counted in 1000 ms up to the one or more first subframes reserved for the one or more transmissions of the current MAC PDU.

12. The wireless device of claim 7, wherein the duration excludes the second subframes reserved for the transmissions of the one or more next MAC PDUs.

* * * * *